UNITED STATES PATENT OFFICE.

WILLIAM J. BELL, OF PHILADELPHIA, PENNSYLVANIA.

PROCESS OF MANUFACTURING STEEL.

SPECIFICATION forming part of Letters Patent No. 465,314, dated December 15, 1891.

Application filed September 1, 1890. Serial No. 363,693. (No specimens.)

*To all whom it may concern:*

Be it known that I, WILLIAM J. BELL, of the city of Philadelphia and State of Pennsylvania, have invented and discovered a certain new and useful Improvement in the Process of Manufacturing Steel; and I do hereby declare the following to be a full, clear, and exact description.

My invention has relation to the manufacture of steel, also copper, brass, and other alloys; and it consists in the process hereinafter particularly described and claimed.

The object of my invention is to produce a superior product in metals at a comparatively small cost by removing the phosphorus, sulphur, and other impurities from the iron and other ores by the employment and process of certain minerals and chemical products hereinafter set forth, the combined action of which is such as to speedily and effectually neutralize, remove, or destroy the impurities contained in the ores.

In carrying my invention into effect the iron or other ores to be treated are introduced into a smelting or other well-known furnace used in the manufacture of steel in any well-known manner. I then introduce, preferably in the same manner, the following minerals, either separately or preferably commingled and compounded together, as may be found in a natural state in certain ores which exist containing such chemical and mineral properties—viz., silica, alumina, oxide of iron, phosphoric acid, carbonate of lime, binoxide of manganese, and combustible matter.

The proportion of the above products introduced is dependent upon the quality of the iron or other ore and quantity of the impurities contained therein. The following proportions of the above-mentioned products to each other preferably employed is as follows: silica in about the proportion of 14.59 parts; alumina in about the proportion of 5.94 parts; oxide of iron in the proportion of about 42.26 parts; phosphoric acid in about the proportion of 0.24 parts; carbonate of lime in about the proportion of 0.44 parts; binoxide of manganese in about the proportion of 0.34 parts; combustible matter in about the proportion of 36.19 parts.

The preferable proportion of the combined total of the above products as set forth to that of the iron or other ore to be treated is from thirty to fifty per cent., though the iron or other ore to be treated may contain impurities to such a degree as to require a greater or less percentage than that just noted. The iron or other ore and the above-mentioned metals will melt simultaneously. The chemical properties of the ore and other metals in their several approximate proportions being liberated and allowed to operate upon each other and upon the metal in the flux, the combined properties of the purifying metals effectually neutralize or destroy the phosphorus, sulphur, and other impurities contained in the iron or other ore, and thus produce after the metal has been drawn or tapped a superior product.

My invention may be employed in either the furnace or converter process in the manufacture of steel and other metals. If the phosphorus or other impurities are not sufficiently removed in the first instance, additional purifying material in substantially the relative proportions above set forth may be introduced when the metal has been turned into the converter, and thus the desired property of the product be accomplished.

By my improved process I am enabled to produce a superior quality of steel from a grade of iron ore heretofore considered unfit for the purpose and at a less cost. The product produced by my improved process is tougher than and superior to that produced by the Bessemer and other well-known processes as now practiced, in which the furnace and converter are employed.

Having thus described my invention, what I claim, and desire to secure by Letters Patent, is—

1. In the manufacture of iron, the process which consists in commingling with the iron silica, alumina, oxide of iron, phosphoric acid, carbonate of lime, binoxide of manganese, and combustible matter and subjecting the mixture to a reducing-heat, substantially in the proportions described.

2. In the manufacture of metal, the process which consists in commingling with iron an ore containing silica, alumina, oxide of iron, phosphoric acid, carbonate of lime, binoxide of manganese, and combustible matter and subjecting the mixture to a reducing-heat in the proportions substantially as described.

WM. J. BELL.

Witnesses:
HARRY A. SUPLEE,
HERMAN LIBELING.